United States Patent
Aguiar et al.

(10) Patent No.: US 10,824,854 B2
(45) Date of Patent: Nov. 3, 2020

(54) SYSTEMS AND METHODS FOR EXTRACTING DATA FROM AN IMAGE

(71) Applicant: SAP SE, Walldorf (DE)

(72) Inventors: Everaldo Aguiar, Bellevue, WI (US); Ravi Sharma, Bangalore (IN); Shivani Patel, Bellevue, WA (US); Jesper Lind, Bellevue, WA (US); Michael Stark, Bellevue, WA (US); Yongjian Bi, Bellevue, WA (US)

(73) Assignee: SAP SE, Walldorf (DE)

( * ) Notice: Subject to any disclaimer, the term of this patent is extended or adjusted under 35 U.S.C. 154(b) by 257 days.

(21) Appl. No.: 16/011,554

(22) Filed: Jun. 18, 2018

(65) Prior Publication Data
US 2019/0384972 A1    Dec. 19, 2019

(51) Int. Cl.
*G06K 9/00* (2006.01)
*G06N 20/00* (2019.01)

(52) U.S. Cl.
CPC ..... *G06K 9/00456* (2013.01); *G06K 9/00463* (2013.01); *G06N 20/00* (2019.01); *G06K 2209/01* (2013.01)

(58) Field of Classification Search
CPC ........... G06K 9/00456; G06K 9/00463; G06K 2209/01; G06K 9/6277; G06N 20/00; G06N 7/005; G06N 5/003; G06N 20/20
See application file for complete search history.

(56) References Cited

U.S. PATENT DOCUMENTS

| | | | | |
|---|---|---|---|---|
| 8,509,534 B2* | 8/2013 | Galic | | G06K 9/38 382/176 |
| 9,070,035 B2* | 6/2015 | Pan | | G06K 9/18 |
| 2005/0259866 A1* | 11/2005 | Jacobs | | G06K 9/00463 382/157 |
| 2011/0222773 A1* | 9/2011 | Radakovic | | G06K 9/00469 382/182 |
| 2014/0229408 A1* | 8/2014 | Vijayaraghavan | | G06N 5/025 706/12 |

* cited by examiner

*Primary Examiner* — Phuoc Tran
(74) *Attorney, Agent, or Firm* — Fountainhead Law Group P.C.

(57) ABSTRACT

Embodiments of the present disclosure pertain to systems and method for extracting data from an image. In one embodiment, a method of extracting data from an image comprises receiving, from an optical character recognition (OCR) system, OCR text in response to sending an image to the OCR system. The OCR text comprises a plurality of lines of text. Each line of text is classified as either a line item or not a line item using a machine learning algorithm, and a plurality of data fields are extracted from each line of text classified as a line item.

20 Claims, 5 Drawing Sheets

US 10,824,854 B2

SYSTEMS AND METHODS FOR EXTRACTING DATA FROM AN IMAGE

BACKGROUND

The present disclosure relates to data extraction and classification, and in particular, to systems and methods for extracting data from an image.

The proliferation of cameras and other electronic image capture devices has led to massive growth in the availability of images. For example, cameras can be found on almost all mobile devices, and such ready access to a camera allows users to capture an ever increasing amount of electronic images. Interestingly, images often contain data, and such data can be useful for a wide range of applications. However, extracting data from an image is no simple task. For example, an image of a receipt, such as a hotel receipt (or folio, a list of charges) may include data about the particular expenses incurred during a hotel stay. However, accurately extracting such data from the image is challenging. Accordingly, it would be advantageous to discover efficient and effective techniques for extracting data from electronic images.

SUMMARY

Embodiments of the present disclosure pertain to systems and method for extracting data from an image. In one embodiment, a method of extracting data from an image comprises receiving, from an optical character recognition (OCR) system, OCR text in response to sending an image to the OCR system. The OCR text comprises a plurality of lines of text. Each line of text is classified as either a line item or not a line item using a machine learning algorithm, and a plurality of data fields are extracted from each line of text classified as a line item.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
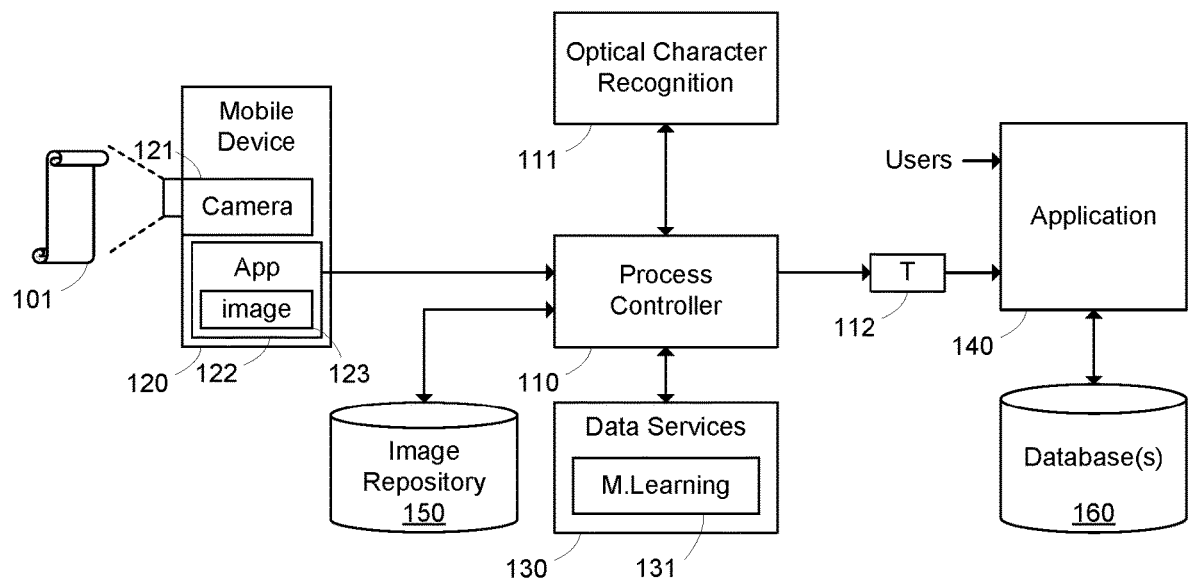
FIG. 1 illustrates an architecture for extracting data from an image according to one embodiment.

FIG. 1 illustrates an architecture for extracting data from an image according to one embodiment. As used herein, an "image" refers to an electronic image, which may include electronic photographs or pictures stored in one of a variety of digital formats, for example. As illustrated in FIG. 1, a mobile device 120 may include a camera 121. Camera 121 may be used to take a picture and create an image 123, which may be stored on mobile device 120. The following description uses an example image of a hotel folio 101 to describe various aspects of the disclosure. However, it is to be understood that this is not the only embodiment that may use the features and techniques described herein. In this example, mobile device 120 includes an application 122 (aka "App"), which, when accessed, automatically accesses the camera. The App may be an "Expense App" that includes functionality for accessing the camera to take a picture of a receipt or folio and sending the image to a backend system, for example.

In this example, the image 123 is sent to a backend software system that includes functionality for extracting data from the image. The backend software system may include a process controller component 110, optical character recognition (OCR) component 111 (e.g., which may be local or remote), image repository 150, data services 130, an Expense application 140, and one or more databases 160. Process controller 110 may receive images from App 123, via email, or through a variety of other image transfer mechanisms (e.g., text, links, etc. . . . ). Process controller 110 may control storing images in repository 150, sending images to OCR system 111, interfacing with data services 130 that analyze data, and forward extracted data to application 140 and database 160, which process and store the data, respectively, so users can interact with the data through application 140, for example. In this example, some or all of the data sent to the application and database may be transformed at 112. In one embodiment, OCR system 111 may be a remote system provided by a third party, for example. Process controller 110 may send an image to OCR system 111, and the OCR system returns OCR text, for example. One example OCR system performs character recognition and produces OCR text comprising a plurality of lines of text (e.g., lines of text that each end in a new line character, "\n").

Features and advantages of the present disclosure include classifying each line of text as either a line item or not a line item using a machine learning algorithm. For example, in the case of hotel folios, it may be desirable to extract a number of specific data elements embedded in the image of a hotel folio. Accordingly, OCR text may include all the characters in the image of the hotel folio arranged in lines of text followed by a new line character, for example, substantially based on how the characters appeared in the folio image (e.g., top to bottom/left to right, where lines comprise text appearing in the same row of the image left to right, and different lines are successive rows of text from the top to the bottom of the image). The lines of text from the OCR text may be classified using a trained machine learning model (e.g., a random forest model), where the model outputs specify that a particular input line of text is either a line item or not a line item. Line items are entries of a list describing elements of an aggregated whole. For example, line items may be entries in a hotel folio that specify a particular expense, such as a room charge, valet parking, room service, TV entertainment, or the like. In any given image, some portions of the image may correspond to line items, while other portions of the image may not correspond to line items.

It can be challenging to automate a system to determine which elements of the image are line items and which are not. In this example, each line of text from the OCR text are classified, line by line, into one of two categories—is a line item or is not a line item. In one embodiment, line items from a portion of an image may each contain the same data fields. Accordingly, once all the line items from the image are determined, a plurality of data fields may be extracted from each line of text classified as a line item. For example, as illustrated below, data fields for a date, an amount, a description, and even an expense type may be extracted once the line items are identified.

Figure 2:
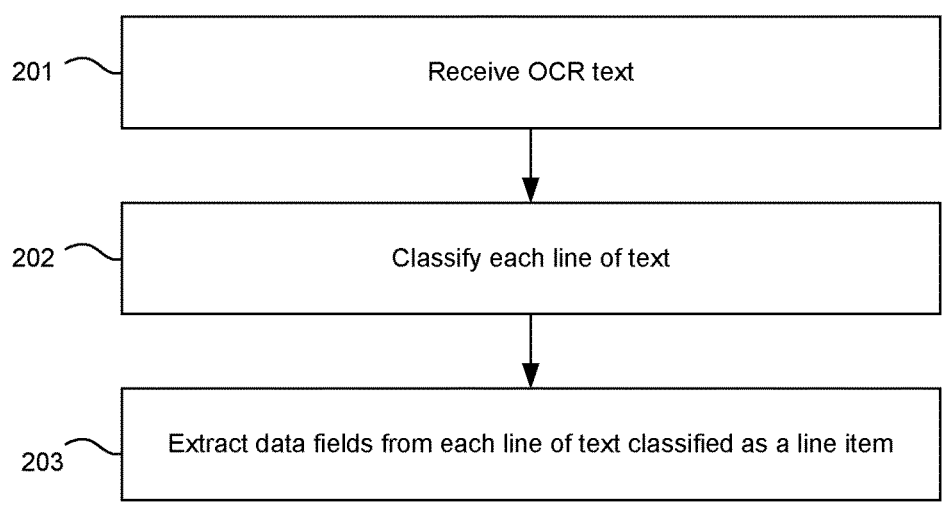
FIG. 2 illustrates a method of extracting data from an image according to one embodiment.

FIG. 2 illustrates a method of extracting data from an image according to one embodiment. At 201, OCR text is received from an optical character recognition (OCR) system, for example, in response to sending an image to the OCR system. The OCR text comprises a plurality of lines of text, which may be rows of characters recognized by the OCR system, for example. At 202, each line of text is classified as either a line item or not a line item using a machine learning algorithm. One example machine algorithm that may be used is a random forest model, for example. At 203, a plurality of data fields are extracted from each line of text classified as a line item. For example, if a line of text includes the characters "03-17-18 Room 79.95," then the line of text may be classified as a line item and the following data fields extracted: date="03-17-18," description: "room," amount: "79.95."

Figure 3:
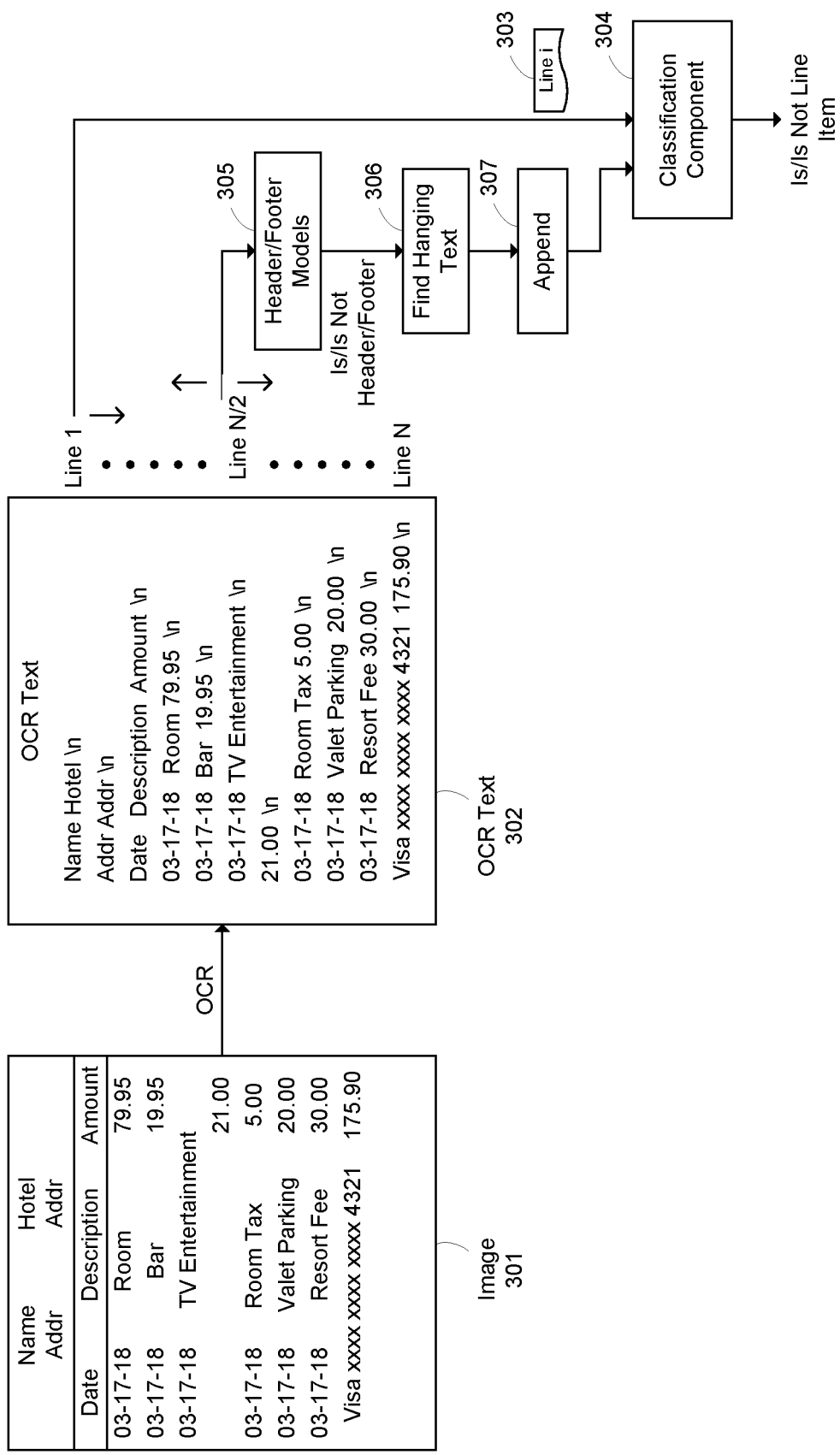
FIG. 3 illustrates an example of extracting data from a hotel folio image according to one embodiment.
Figure 4:
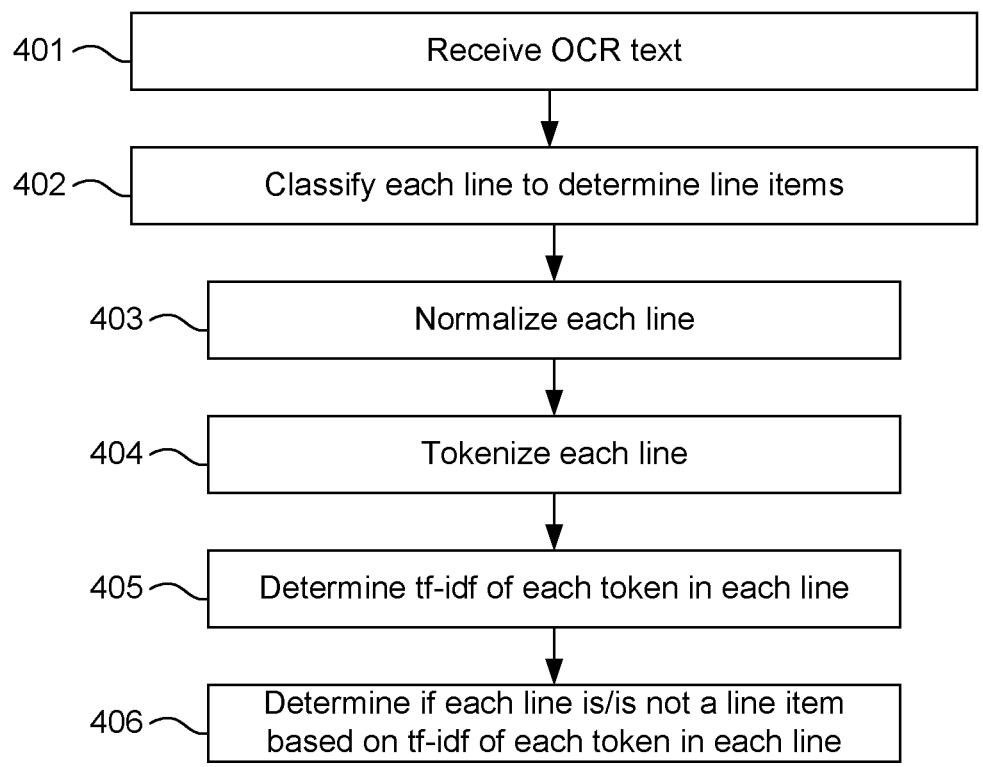
FIG. 4 illustrates a method of extracting data from an image according to another embodiment.

FIGS. 3-4 illustrates an example of extracting data from a hotel folio image according to one embodiment. In this example, an image 301 may be a hotel folio image including a name and address of the guest, name and address of the hotel, a header specifying columns for date, description, and amount, a series of line items for room, bar, TV, tax, parking, and resort fee, and a footer showing a credit card charge, for example. The image may be processed by an OCR system to produce recognized characters in OCR text 302. As illustrated in the process flow of FIG. 4, OCR text is received at 401. Referring again to FIG. 3, in this example the image is transformed into lines of text followed by new lines "\n" for each line. For example, a top line has "Name Hotel \n", an adjacent line below the top line has text from the address, the next line has text from the header, and so on downto the footer text line and any additional lines that might fall below the header, for example.

Each line of text may be preprocessed and analyzed by a machine learning algorithm, such as a random forest model, for example. Each line of text may be preprocessed prior to classification. Example embodiments of classification, illustrated at 402 in FIG. 4, may include such preprocessing. For the following description, the example line of text shall be "03-17-18 Room 79.95." For example, in one embodiment the text in each line may be normalized as illustrated at 403 in FIG. 4. In one example normalization scheme, all numbers may be set to the same number (e.g., 03-17-18 may be set to 77-77-77 and 79.95 may be set to 77.77). As another example, all letters may be set to lower case (e.g., "Room" may be set to "room"). Normalization advantageously reduces the number of different patterns and may improve classification results, for example. In one embodiment, a classification software component performs said classifying step, including said normalizing numbers step. However, the normalizing number step may occur as the lines of text are processed. Accordingly, a version of the line with the actual numeric values is retained. Thus, the numbers in the lines of text are not normalized when input to the data extracting process so that the actual data values may be extracted from the lines and stored in an application database, for example.

In addition to normalization, the lines of text may be tokenized as illustrated at 404 in FIG. 4. For example, after normalization, the line of text may be as follows "77-77-77 room 77.77" (where digits are normalized to "7" and alphabetical characters set to lower case). Tokens may be determined by setting each token to successive sequences of characters between each space (or whitespace). Thus, in this example, the following three (3) tokens are generated: "77-77-77," "room," and "77.77."

After preprocessing, a term frequency-inverse document frequency (tf-idf) is determined for each of the plurality of tokens from each line of text. This is illustrated at 405 in FIG. 4. The tf-idf may be performed per line and per token, for example. The tf-idf includes a plurality of parameters comprising a total number of lines of text, n, from a corpus of lines of text used to train the classification model, a term frequency specifying a number of times the term, t, shows up in a document, d, and a document frequency specifying a number of documents, d, that contain the term t. Documents in this example may be individual lines of text from the OCR text, and terms, t, are the tokens. Tf-idf for each token may be calculated as follows:

$$Tf\text{-}idf(d,t) = tf(t) * idf(t), \text{ where } idf(t) = \log((1+n)/(1+df(d,t))) + 1,$$

Where t are terms (here, tokens), d are documents (e.g., here, individual lines from the OCR text), tf(t) is the term frequency equal to the number of times a term, t, appears in a document, idf(t) is the inverse document frequency (e.g., the equation here is referred to as a "smooth" idf, but other similar equations could be used), df(d,t) is the document frequency equal to the number of documents in the training set that contain term, t, and n is the total sample size of training documents, which in this example are all the lines of OCR text used to train the model, for example. In this example implementation, the system may not keep track of which lines came from which hotel folio, or how many lines a given hotel folio has. Rather, the system processes each line to determine if a line of OCR text is a line item or not as further illustrated below.

Once the tf-idf values are determined, the tf-idf of the plurality of tokens from each line of text are processed by classification component (or "classifier") 304 using a trained classification model to produce an output for each line of text. Classifier 304 may determine if each line is/is not a line item based on the tf-idf of each token in each line as shown at 406. The output of classifier 304 may have a first value (e.g., 1) corresponding to the line of text being a line item, and the output has a second value (e.g., 0) corresponding to the line of text being not a line item. For example, the line with text "Date Description Amount \n" may be preprocessed, converted to three (3) tf-idf values for "date," "description," and "amount," and input to classifier 304. The output of classifier 304 may be one of two values corresponding to "is a line item" and "not a line item." Tf-idf values for "date," "description," and "amount" may produce an output corresponding to "not a line item." Next, the line with text "03-17-18 Room 79.95" may be converted to three (3) tf-idf values for the tokens "77-77-77," "room," and "79.95," and input to the classifier 304. In this case, the output of classifier 304 may correspond to "is a line item." Similarly, all the lines of text are classified line by line. Each line may be associated with either "is a line item" or "not a line item" (e.g., the lines may be tagged).

Figure 5:
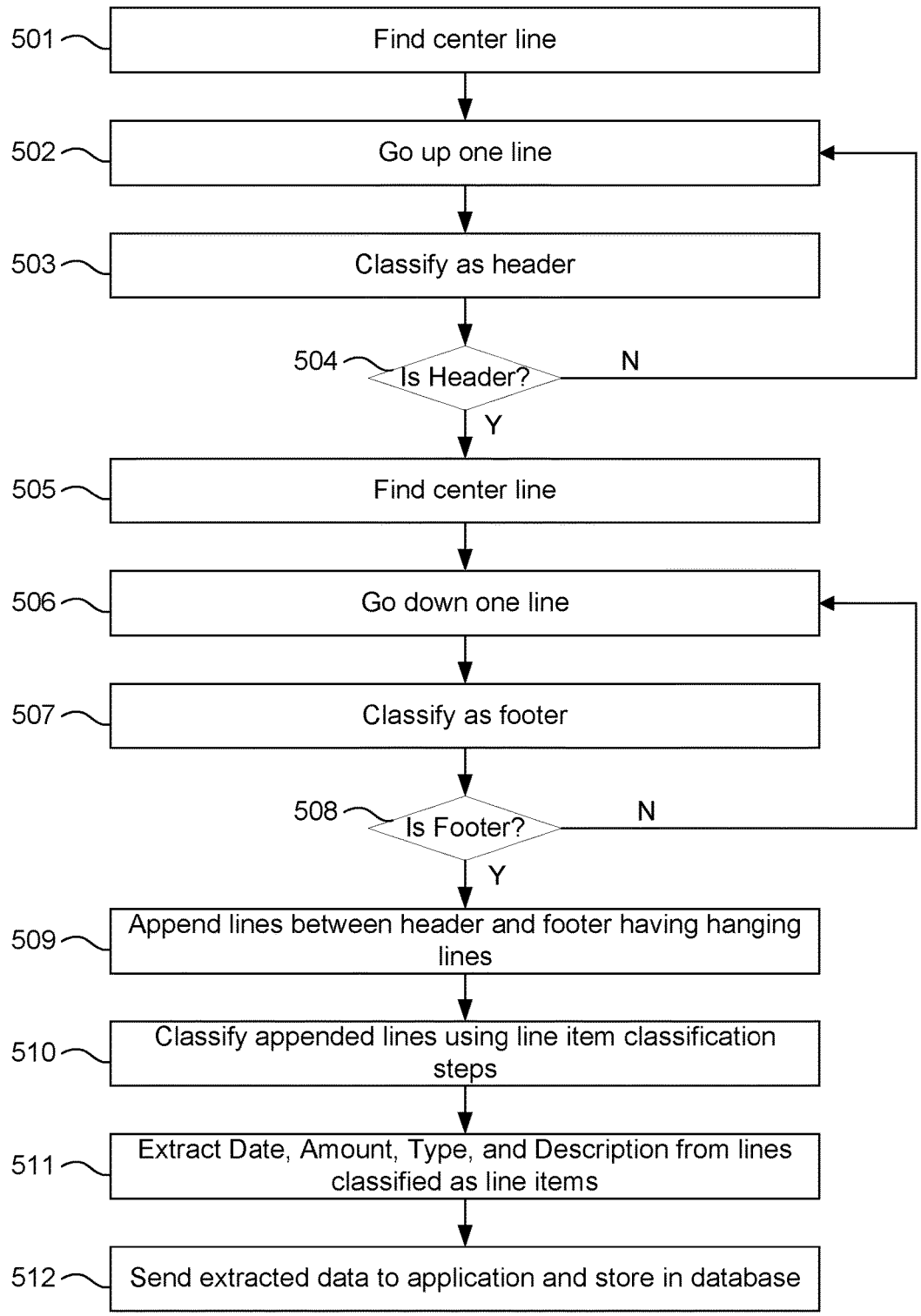
FIG. 5 illustrates a method of extracting data from an image according to yet another embodiment.

FIG. 5 illustrates an example process flow for extracting data fields according to an embodiment. Referring to FIGS. 3 and 5, at 501 a center line in the lines of text is determined. For example, the center line may be found by dividing the lines of text by two or finding a midpoint line (e.g., line N/2 in FIG. 3). To find the header, the process moves up one line from the center line at 502. At 503, the current line is classified as either "Header" or "Not a Header." Classification may include similar preprocessing as described above with respect to determine a line item (e.g., normalizing and tokenizing). In one embodiment, classification may use a logistic regression model as a machine learning model, for example, which returns one value (e.g., 1) corresponding to "Header" and another value (e.g., 0) corresponding to "Not a Header" as illustrated at 504. If not a header, then the process moves to 502 and the system increments up a line at 502 and classifies the next line at 503. When a header is found, the process returns to the center line at 505. At 506, the process moves down one line from the center line. At 507, the current line is classified as either "Footer" or "Not a Footer." Classification may include similar preprocessing as described above with respect to determine a line item (e.g., normalizing and tokenizing). In one embodiment, classification may use a logistic regression model as a machine learning model, for example, which returns one value (e.g., 1) corresponding to "Footer" and another value (e.g., 0) corresponding to "Not a Footer" as illustrated at 508. If not a footer, then the process moves to 506 and the system increments down a line at 506 and classifies the next line at 507. When a footer is found, the process examines the lines between the header/footer.

Certain embodiments may include finding and appending hanging lines. A hanging line is illustrated in FIG. 3 where one data field, here the description "TV entertainment," has been placed on a different line than another data field, here amount "21.00." Embodiments of the disclosure may examine lines that have been identified as line items to determine if some, but not all, of the data fields are included. If a line identified as a line item has a plurality of expected data fields, but is missing one or more other data fields, then the process may examine the next line to determine if the missing data field is in the next line. If so, the line is determined to be a hanging line. Hanging lines between the header and footer are appended at 509. Hanging lines are then processed again to determine if the lines are in fact line items as illustrated at 510. Hanging lines may be normalized, tokenized, and classified using the techniques described above to determine if such lines are line items or not, for example.

Identification of headers, footers, and hanging text are illustrated in FIG. 3 at 305-307, for example.

At 511, all the identified line items are then processed to extract data fields. For example, each line of text identified as a line item may have a date, description, and amount extracted from the line item. Additionally, the line items may be processed by yet another classifier to determine an expense type, for example. Classification of each line item to determine expense type may include normalizing and tokenizing the line item text, and classifying tf-idfs for the tokens using a random forest model, for example, that performs a multi-class determination. The output corresponds to one of a plurality of expense types, for example. In one embodiment, the classifier outputs corresponding to expense types are translated into FLI type keys ("Folio Line Items"), which may be translated to particular descriptions of expenses when sent to the backend application, for example. At 512, the extracted data may be sent to the backend application and stored in a database, for example.

In one embodiment, the classification model is trained using a corpus of lines of text, for example. Each line of text in the corpus of lines of text may be associated with an indicator specifying that a line of text is a line item or is not a line item, for example. The training may include normalizing numbers in each line of text in the corpus to a same value, tokenizing each line of text in the corpus to produce a plurality of training tokens, determining a term frequency-inverse document frequency (tf-idf) of the plurality of tokens from each line of text in the corpus; and processing the tf-idf of the plurality of training tokens from each line of text in the corpus using a classification model to produce the trained classification model.

In one embodiment, the model to determine line items is a random forest model. Header and footer classification may use separate models. Headers in a training set are tagged as "Header" and other lines in the corpus tagged with "Not Header" to train the "header" model. Similarly, footers in a training set are tagged as "Footer" and other lines in the corpus tagged with "Not Footer" to train the "footer" model, for example.

Hardware

Figure 6:
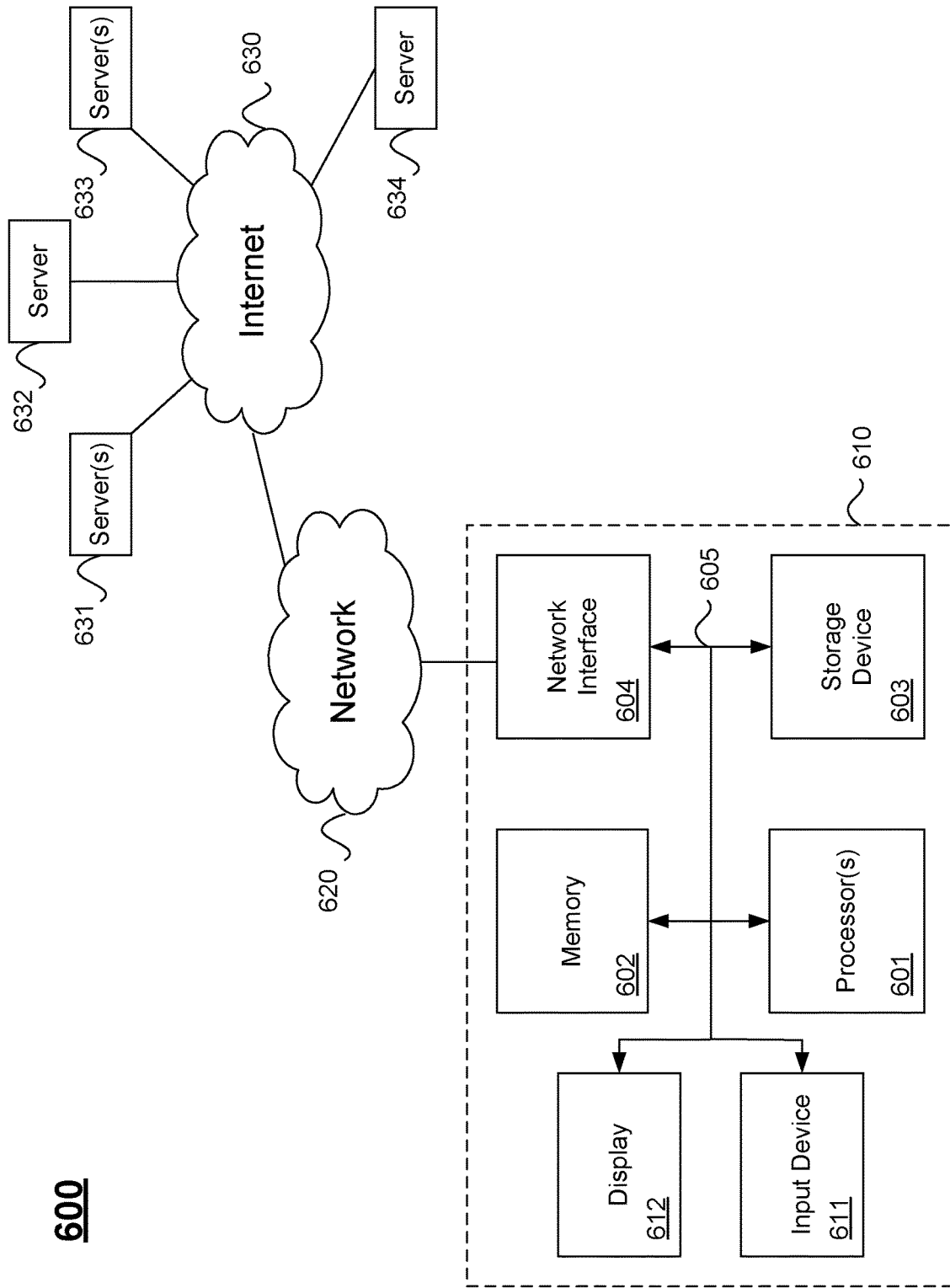
FIG. 6 illustrates hardware of a special purpose computing machine configured according to the above disclosure.

FIG. 6 illustrates hardware of a special purpose computing machine configured according to the above disclosure. The following hardware description is merely one example. It is to be understood that a variety of computers topologies may be used to implement the above described techniques. An example computer system 610 is illustrated in FIG. 6. Computer system 610 includes a bus 605 or other communication mechanism for communicating information, and one or more processor(s) 601 coupled with bus 605 for processing information. Computer system 610 also includes a memory 602 coupled to bus 605 for storing information and instructions to be executed by processor 601, including information and instructions for performing some of the techniques described above, for example. Memory 602 may also be used for storing programs executed by processor(s) 601. Possible implementations of memory 602 may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device 603 and memory 602 are both examples of non-transitory computer readable storage mediums.

Computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses for coupling various components of the computer together, for example.

Computer system 610 also includes a network interface 604 coupled with bus 605. Network interface 604 may provide two-way data communication between computer system 610 and a local network 620. Network 620 may represent one or multiple networking technologies, such as Ethernet, local wireless networks (e.g., WiFi), or cellular networks, for example. The network interface 604 may be a wireless or wired connection, for example. Computer system 610 can send and receive information through the network interface 604 across a wired or wireless local area network, an Intranet, or a cellular network to the Internet 630, for example. In some embodiments, a browser, for example, may access data and features on backend software systems that may reside on multiple different hardware servers on-prem 631 or across the Internet 630 on servers 632-635. One or more of servers 632-635 may also reside in a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method of extracting data from an image comprising:
   receiving, from an optical character recognition (OCR) system, OCR text in response to sending an image to the OCR system, wherein the OCR text comprises a plurality of lines of text;
   classifying each line of text as either a line item or not a line item using a machine learning algorithm, comprising:
   processing a term frequency-inverse document frequency (tf-idf) of a plurality of tokens from the plurality of lines of text using a trained classification model to produce an output indicating whether each of the plurality of lines of text is a line item or not a line item, wherein a line item is an individual expense item in a list of expense items; and
   extracting a plurality of data fields from each line of text classified as a line item.

2. The method of claim 1 wherein classifying further comprises:
   normalizing numbers in each line of text to a same value;
   tokenizing each line of text to produce the plurality of tokens;
   determining the tf-idf of the plurality of tokens from each line of text, wherein the output indicating whether each of the plurality of lines of text is a line item or not a line item includes a first value corresponding to the line of text being a line item or a second value corresponding to the line of text being not a line item.

3. The method of claim 2 wherein a classification software component performs said classifying step, including said normalizing numbers step, said normalizing number step occurring as the lines of text as the lines of text are processed, and wherein numbers in the lines of text are not normalized when input to said extracting step.

4. The method of claim 1 wherein the classification model is a random forest model.

5. The method of claim 1 wherein the tf-idf of each token in each line of text comprises a plurality of parameters comprising:
   a total number of lines of text, n, from a corpus of lines of text used to train the classification model;
   a term frequency specifying a number of times the term, t, shows up in a document, d; and
   a document frequency specifying a number of documents, d, that contain the term t,
   wherein documents are individual lines of text from the OCR text and terms are tokens.

6. The method of claim 5 further comprising training the classification model using a corpus of lines of text, wherein each line of text in the corpus of lines of text is associated with an indicator specifying that a line of text is a line item or is not a line item, said training comprising:
   normalizing numbers in each line of text in the corpus to a same value;
   tokenizing each line of text in the corpus to produce a plurality of training tokens;
   determining a term frequency-inverse document frequency (tf-idf) of the plurality of tokens from each line of text in the corpus; and
   processing the tf-idf of the plurality of training tokens from each line of text in the corpus using a classification model to produce said trained classification model.

7. The method of claim 1 further comprising:
   determining if adjacent lines of text comprise hanging text, wherein hanging text is a plurality of adjacent lines of text that form a single line item;
   appending the adjacent lines of text; and
   classifying the appended adjacent lines of text as either a line item or not a line item using the machine learning algorithm.

8. The method of claim 7 wherein determining if adjacent lines of text comprise hanging text comprises:
   determining a center line of text; and
   sequentially processing each line of text, starting at a line of text adjacent to the center line of text, until a header line of text and a footer line of text is found,
   wherein said determining if the adjacent lines of text comprise hanging text comprises sequentially processing the lines of text between the header line of text and footer line of text.

9. The method of claim 8 wherein sequentially processing each line of text, starting at a line of text adjacent to the center line of text, until a header line of text is found comprises:
   moving up one line of text;
   classifying the current line of text using a second classification model to determine if the current line of text is a header line of text or not a header line of text;
   repeating said moving up one line of text and said classifying the current line of text until said classifying determines that the current line of text is a header line of text.

10. The method of claim 8 wherein sequentially processing each line of text, starting at a line of text adjacent to the center line of text, until a header line of text and a footer line of text is found comprises:
    moving down one line of text;
    classifying the current line of text using a third classification model to determine if the current line of text is a footer line of text or not a footer line of text;
    repeating said moving down one line of text and said classifying the current line of text until said classifying determines that the current line of text is a footer line of text.

11. A computer system comprising:
    one or more processors; and
    non-transitory machine-readable medium coupled to the one or more processors, the non-transitory machine-readable medium storing a program executable by at least one of the processors, the program comprising sets of instructions for:

receiving, from an optical character recognition (OCR) system, OCR text in response to sending an image to the OCR system, wherein the OCR text comprises a plurality of lines of text;

classifying each line of text as either a line item or not a line item using a machine learning algorithm, comprising:

processing a term frequency-inverse document frequency (tf-idf) of a plurality of tokens from the plurality of lines of text using a trained classification model to produce an output indicating whether each of the plurality of lines of text is a line item or not a line item, wherein a line item is an individual expense item in a list of expense items; and extracting a plurality of data fields from each line of text classified as a line item.

12. The computer system of claim 11 wherein classifying further comprises:

normalizing numbers in each line of text to a same value;

tokenizing each line of text to produce the plurality of tokens;

determining the tf-idf of the plurality of tokens from each line of text, wherein the output indicating whether each of the plurality of lines of text is a line item or not a line item includes a first value corresponding to the line of text being a line item or a second value corresponding to the line of text being not a line item.

13. The computer system of claim 11 wherein the tf-idf of each token in each line of text comprises a plurality of parameters comprising:

a total number of lines of text, n, from a corpus of lines of text used to train the classification model;

a term frequency specifying a number of times the term, t, shows up in a document, d; and a document frequency specifying a number of documents, d, that contain the term t, wherein documents are individual lines of text from the OCR text and terms are tokens.

14. The computer system of claim 11 the program further comprising sets of instructions for:

determining if adjacent lines of text comprise hanging text, wherein hanging text is a plurality of adjacent lines of text that form a single line item;

appending the adjacent lines of text; and classifying the appended adjacent lines of text as either a line item or not a line item using the machine learning algorithm.

15. The computer system of claim 14 wherein determining if adjacent lines of text comprise hanging text comprises:

determining a center line of text; and sequentially processing each line of text, starting at a line of text adjacent to the center line of text, until a header line of text and a footer line of text is found, wherein said determining if the adjacent lines of text comprise hanging text comprises sequentially processing the lines of text between the header line of text and footer line of text.

16. A non-transitory machine-readable medium storing a program executable by at least one processing unit of a computer, the program comprising sets of instructions for:

receiving, from an optical character recognition (OCR) system, OCR text in response to sending an image to the OCR system, wherein the OCR text comprises a plurality of lines of text;

classifying each line of text as either a line item or not a line item using a machine learning algorithm, comprising:

processing a term frequency-inverse document frequency (tf-idf) of a plurality of tokens from the plurality of lines of text using a trained classification model to produce an output indicating whether each of the plurality of lines of text is a line item or not a line item, wherein a line item is an individual expense item in a list of expense items; and extracting a plurality of data fields from each line of text classified as a line item.

17. The non-transitory machine-readable medium of claim 16 wherein classifying further comprises:

normalizing numbers in each line of text to a same value;

tokenizing each line of text to produce a plurality of tokens;

determining the tf-idf of the plurality of tokens from each line of text, wherein the output indicating whether each of the plurality of lines of text is a line item or not a line item includes a first value corresponding to the line of text being a line item or a second value corresponding to the line of text being not a line item.

18. The non-transitory machine-readable medium of claim 16 wherein the tf-idf of each token in each line of text comprises a plurality of parameters comprising:

a total number of lines of text, n, from a corpus of lines of text used to train the classification model;

a term frequency specifying a number of times the term, t, shows up in a document, d; and a document frequency specifying a number of documents, d, that contain the term t, wherein documents are individual lines of text from the OCR text and terms are tokens.

19. The non-transitory machine-readable medium of claim 16, the program further comprising sets of instructions for:

determining if adjacent lines of text comprise hanging text, wherein hanging text is a plurality of adjacent lines of text that form a single line item;

appending the adjacent lines of text; and classifying the appended adjacent lines of text as either a line item or not a line item using the machine learning algorithm.

20. The non-transitory machine-readable medium of claim 19 wherein determining if adjacent lines of text comprise hanging text comprises:

determining a center line of text; and sequentially processing each line of text, starting at a line of text adjacent to the center line of text, until a header line of text and a footer line of text is found, wherein said determining if the adjacent lines of text comprise hanging text comprises sequentially processing the lines of text between the header line of text and footer line of text.

\* \* \* \* \*